3,509,119
PROCESS FOR COPOLYMERIZING BENZENE AND
BUTADIENE AND RESULTING PRODUCT
Russell G. Hay, Gibsonia, Pa., Leo F. Meyer, Richmond,
Va., and Charles M. Selwitz, Pitcairn, Pa., assignors to
Gulf Research & Development Company, Pittsburgh,
Pa., a corporation of Delaware
No Drawing. Filed Aug. 30, 1968, Ser. No. 756,370
Int. Cl. C08d 3/06
U.S. Cl. 260—94.3
4 Claims

ABSTRACT OF THE DISCLOSURE

A process for copolymerizing benzene with butadiene in the presence of a Ziegler-type catalyst system and the copolymer product resulting therefrom.

The copolymerization of benzene with butadiene is an extremely difficult task. In U.S. Patent No. 1,947,626 Thomas discloses that substituted benzenes can be copolymerized with a conjugated diene in the presence of solid aluminum chloride or other solid acid-acting halide catalyst at temperatures of 20° C. and above, but that benzene itself does not react under these conditions. In U.S. Patent No. 2,624,726 Serniuk shows that benzene can be made to react with the conjugated diolefin in the presence of a dissolved Friedel-Crafts catalyst provided the temperature is maintained below 0° C. To maintain the Friedel-Crafts catalyst in a dissolved state during the reaction Serniuk must use a low-freezing, inert or non-complex forming solvent, such as ethyl or methyl chloride or carbon disulfide or the like.

We have found that the desired copolymerization of benzene with butadiene can be obtained under easily-obtainable temperature conditions, for example, within the range of about 10° to about 180° C., without the necessity of an extraneous solvent by conducting the reaction in the presence of a "Ziegler-type" catalyst system, that is, one obtained using an organo aluminum halide and a heavy metal halide.

The organo aluminum halide which forms one of the active agents in the catalyst system employed herein can be defined by the formula $R_aAlX_b$, wherein R can be an aromatic radical, such as phenyl, tolyl, xylyl, etc.; or an alkyl radical having from one to ten carbon atoms, preferably from one to four carbon atoms, such as methyl, ethyl, propyl, isopropyl, isobutyl, normal butyl, etc.; X is a halogen atom selected from the group consisting of fluorine, chlorine, bromine and iodine; and $a$ and $b$ are values from one to two. Examples of organo aluminum halides which can be employed are methylaluminum sesquichloride, ethylaluminum sesquibromide, isobutylaluminum sesquichloride, diethylaluminum chloride, ethylaluminum sesquifluoride, n-butylaluminum dibromide, decylaluminum sesquichloride, methylaluminum sesquiiodide, etc.

The heavy metal halide which is employed in conjunction with the organo aluminum halide as the second active agent in the catalyst system is critical in order to obtain the desired copolymerization of this invention. The metallic portion thereof must be selected from Group IV–B of the Periodic Table, that is, titanium, zirconium and hafnium, while the halide portion can be chloride, bromine, fluorine or iodine. Thus, a titanium halide, such as titanium tetrachloride ($TiCl_4$), a zirconium halide, such as zirconium tetrachloride ($ZrCl_4$) and a hafnium halide, such as hafnium tetrachloride ($HfCl_4$), can be employed with the organo aluminum halide and excellent results will be obtained.

The amounts of reactants and catalyst employed herein can be varied over a wide range. Thus, the mol ratio of butadiene to benzene can be from about 0.8:1 to about 4:1, preferably from about 1:1 to about 2:1. The mol ratio of heavy metal halide to organo aluminum halide can range from about 1:1 to about 9:1, preferably from about 3:1 to about 4:1. The concentration of total catalyst can be, for example, as little as about 0.1 millimol per mol of benzene, but preferably is within the range of about one to about ten millimols of catalyst per mol of benzene. The catalyst components can be admixed with each other prior to addition to the benzene and butadiene, or the catalyst components can be admixed in the presence of the benzene and the butadiene can be added to this mixture.

The polymerizable composition defined above can be polymerized in any convenient manner. In a preferred embodiment the benzene is added to the reaction vessel and, under a blanket of suitable inert gas, such as nitrogen, the catalyst components are added. It is desirable that the polymerization reactor be sealed so as to exclude the atmosphere therefrom. This is because oxygen and moisture tend to interfere with the polymerization by deactivation of the catalysts, in known manner. The catalyst is therefore added to the reactor in such a manner that it does not come in contact with the atmosphere. Accordingly, the reactor is equipped with suitable fixtures to permit such charging of the catalyst and the conjugated diene. A typical procedure comprises maintaining the butadiene in a separate vessel and thereafter metering the same to the reactor, effecting the combination of the benzene, the catalyst and the butadiene in the reactor. The combination of these aforementioned ingredients is, of course, the polymerizable composition as defined above. It is best that the benzene, butadiene and catalyst be thoroughly mixed from the start. In a batch reactor this is simply accomplished by agitation. In continuous operations which employ, for example, a tubular reactor, this mixing can be accomplished by feeding a catalyst-reactants mixture in at a point near the inlet for the diene. In batch and continuous operations the residence time of the polymerization mixture is controlled by any suitable means which are shown in the art. As has been indicated above, the mixture of benzene and catalyst is, in a preferred embodiment of the polymerization process, first prepared and the butadiene is metered into this mixture to effect polymerization.

As noted, the temperature at which polymerization can be successfully obtained can range from about 10° to about 180° C., but preferably is from about 50° to about 180° C. The reaction period is not critical, being dependent upon the temperature and the concentration of catalyst and can therefore range from a few minutes to as much as ten hours or even more. A period of about three to about six hours has been found to be quite adequate. Polymerization can be achieved successfully over a wide range of pressure such as, for example, from about one to about 200 pounds per square inch gauge, preferably from about 25 to about 125 pounds per square inch gauge.

At the end of the reaction period the reaction product can be worked up in any desired or suitable manner in order to recover the desired copolymer. Thus, the reaction product can be subjected to a vaporization procedure under vacuum to remove vapors therefrom and the remainder can then be treated with about 0.5 to about 500 parts by weight of a polar, low-boiling organic solvent, such as methanol, ethanol, acetic acid, etc., followed by filtration and drying of the recovered solid product. The copolymer obtained has a high, undeterminable molecular weight and the following is a representative segment of the structural formula:

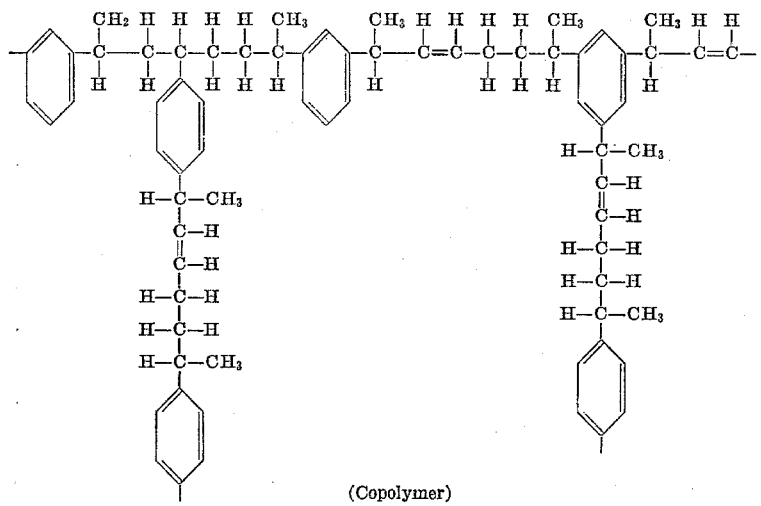

(Copolymer)

As seen from the above the copolymer obtained from benzene and butadiene in accordance with the process defined herein comprises randomly spaced phenylene and butadieyl segments with at least one butadieyl segment between each phenylene segment, randomly crosslinked by chains of phenylene and butadieyl segments with at least one butadieyl segment between each phenylene segment. By "phenylene" we mean to include the species wherein two hydrogens have been removed from benzene and by "butadieyl" a straight chain four-carbon moiety consisting of carbon and hydrogen and containing at least two substituents and no more than one double bond.

The reaction leading to the copolymer is believed to proceed in accordance with the following in the presence of the catalyst, for example, ethyl aluminum sesquichloride, $Et_3Al_2Cl_3$, and $TiCl_4$ employed herein:

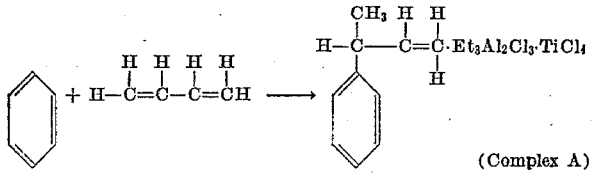

(Complex A)

Complex A then reacts with another butadiene to form Complex B:

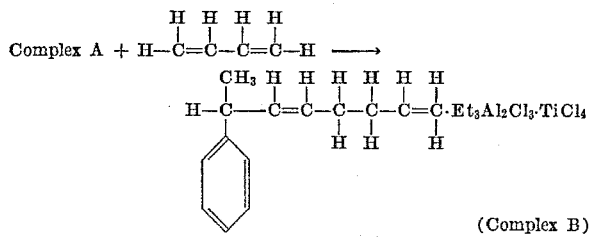

(Complex B)

Complex B then reacts with another benzene to form Complex C:

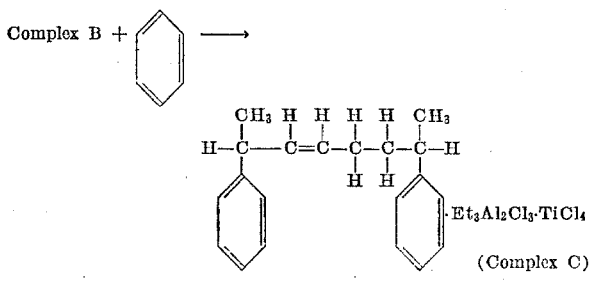

(Complex C)

The growing Complex C reacts with butadiene to form Complex D:

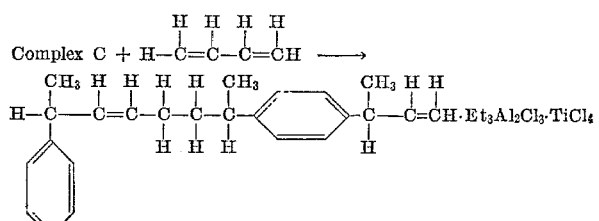

(Complex D)

Continued growth to Complex E follows:

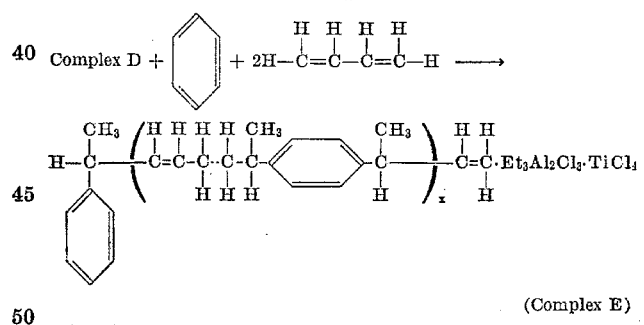

(Complex E)

wherein $x$ is an integer from about 10 to about $10^6$, preferably about $10^2$ to about $10^5$. Complex E then breaks down into its separate components, namely, the polymeric portion and the catalytic component. Furthermore, active growing chains of the type of Complex C react with olefinic unsaturation in other copolymer chains that have been formed and active growing chains of the type of Complex D can react with aromatic linkages in other copolymer chains, each type tending to occur randomly to give a highly-crosslinked polymeric network therein resulting in the desired copolymer of this invention as defined hereinabove.

The copolymer can be recovered from the reaction product in any convenient manner. For example, the reactor can be vented to allow recovery of unreacted butadiene. Other higher boiling reactants can be isolated by filtration while the final removal of residual reactants is best done by heating the product from about 25° to about 150° C., preferably from about 50° to about 100° C. in a vacuum of about 0.0001 to about 14 pounds per square inch gauge, preferably about 10 pounds per square inch gauge for about 0.1 to about 10 hours.

The copolymers of the instant invention find utility in a broad range of applications. They can be fabricated into films, foils, fibers, and massive or structural articles.

The copolymers can be employed for coating applications including can coatings, wire coating and other dielectric applications. The copolymers can further be used as resins in the preparation of reinforced plastic laminates with glass and other synthetic fibers. In the above and other applications the copolymers prepared by the instant process can be used either alone or in admixture with other resins or reactive monomers.

The process of this invention as set forth above will further be understood by reference to the following:

EXAMPLE I

To an oven-dried, nitrogen-flushed, steel pressure reactor bolted in place and evacuated were charged 176 grams (2.26 mols) of benzene. The reactor was brought to atmospheric pressure with nitrogen, at which point 12.5 millimols per liter (0.40 cc.) of ethyl aluminum sesquichloride and 37.5 millimols per liter (1.64 cc.) of TiCl₄ were charged. The reactor was brought to 90° C., the stirrer was activated and butadiene was pressured in from a preheated premixer. The reactor temperature was kept at about 100° C. for three hours and then brought to 170° C. over a final hour. Butadiene was pressured in at 100 pounds per square inch gauge and in this manner 140 grams (2.69 mols) of butadiene was fed to the reactor. At the end of the reaction period seven grams of butadiene were vented and a solid product was recovered, which weighed 221 grams. The product was dried to constant weight in a vacuum oven at 50° C. There was thus isolated 186 grams of hard resin and thirty grams of rubbery product. The rubbery product is polybutadiene, whereas the hard resin is the copolymer of this invention. The copolymer was found to be insoluble in benzene, indicating that it is highly crosslinked, that is, it contains long chains which are themselves interconnected to form a three-dimensional lattice which does not permit solution. In contrast, the polymer obtained by Serniuk in U.S. Patent No. 2,624,726, using a Friedel-Crafts catalyst, is not so crosslinked, since it is soluble. The copolymer obtained, which falls within the scope of the formula set forth hereinabove, contained 98 grams of butadiene (1.82 mols) and 88 grams of benzene (1.13 mols). The copolymer (26 grams) was oxidized with 164 cc. of seventy percent nitric acid and 180 cc. of water in an autoclave at 218° C. for three hours. Water and unreacted nitric acid were pulled off the product under vacuum. Fresh water was added thereafter and then stripped off twice to remove the last traces of nitric acids. Polybasic aromatic acids were isolated by dissolving the light brown solid in caustic and precipitating the aromatic acids by treatment with HCl. This means that butadiene attachment occurred on at least two positions of the benzene ring and serves to prove that more than the mere incorporation of benzene onto the polybutadiene chain (which only could have given monobasic benzoic acid) was involved, but rather copolymerization.

EXAMPLE II

To a reactor prepared as in Example I above were added 200 cc. of benzene, 0.40 cc. of ethyl aluminum sesquichloride and 6.64 cc. of titanium tetrachloride and the temperature was raised to 60° C. under nitrogen. Butadiene was pressured in at 25 to 50 pounds per square inch gauge for four hours. 175 grams of the polymer were obtained.

Obviously, many modifications and variations of the invention, as hereinabove set forth, can be made without departing from the spirit and scope thereof, and therefore only such limitations should be imposed as are indicated in the appended claims.

We claim:
1. A process for producing a copolymer which comprises reacting butadiene with benzene at an elevated temperature of about 10° to about 180° C. in the presence of an organo aluminum halide of the formula $R_aAlX_b$, wherein R is an aromatic radical or an alkyl radical, X is a halogen atom and $a$ and $b$ are values from one to two and a Group IV-B heavy metal halide wherein the mol ratio of butadiene to benzene is from about 0.8:1 to about 4:1 and the mol ratio of said heavy metal halide to said organo aluminum halide is from about 1:1 to about 9:1.

2. The process of claim 1 wherein the organo aluminum halide is an alkyl aluminum chloride and the heavy metal halide is a titanium halide.

3. The process of claim 1 wherein the organo aluminum halide is ethyl aluminum sesquichloride and the heavy metal halide is titanium tetrachloride.

4. A copolymer of benzene and butadiene, highly crosslinked, having a three-dimensional lattice and insoluble in benzene, containing the segment represented by the following structural formula:

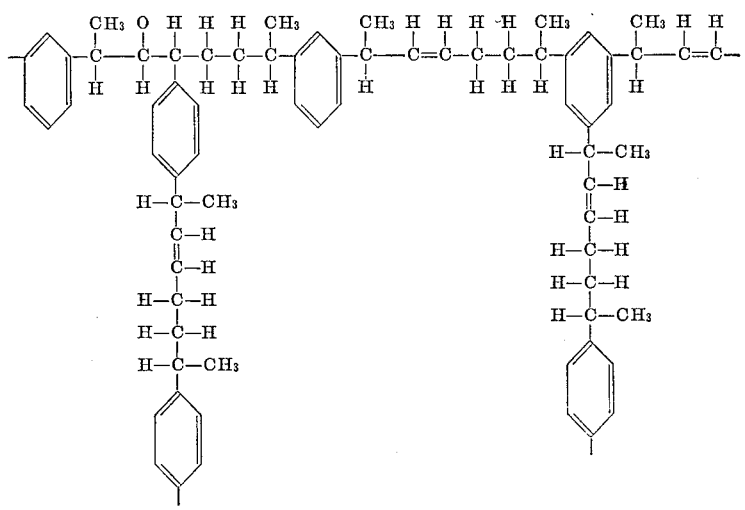

References Cited

UNITED STATES PATENTS 2,624,726  12/1949  Serniuk _____ 260—94.2

FOREIGN PATENTS 884,930  12/1961  Great Britain.
824,456  12/1959  Great Britain.

JOSEPH L. SCHOFER, Primary Examiner

R. A. GAITHER, Assistant Examiner

PO-1050
(5/69)

UNITED STATES PATENT OFFICE
CERTIFICATE OF CORRECTION

Patent No. 3,509,119  Dated  April 28, 1970

Inventor(s) Russell G. Hay, Leo F. Meyer, Charles M. Selwitz

It is certified that error appears in the above-identified patent and that said Letters Patent are hereby corrected as shown below:

Column 1, line 7 of Paragraph 4, "chloride" should read "chlorine".

Column 3, line 1 of the structural formula, "$CH_2$" should read "$CH_3$".

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents